United States Patent  (10) Patent No.: US 8,439,535 B2
Yu  (45) Date of Patent: May 14, 2013

(54) STRUCTURE OF MOTORCYCLE TAILLIGHT

(75) Inventor: Chien-Chih Yu, Kaohsiung (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 133 days.

(21) Appl. No.: 13/099,362

(22) Filed: May 3, 2011

(65) Prior Publication Data

US 2011/0310629 A1 Dec. 22, 2011

(30) Foreign Application Priority Data

Jun. 17, 2010 (TW) .............................. 99119619 A

(51) Int. Cl.
*B60Q 1/56* (2006.01)
(52) U.S. Cl.
USPC .............................. 362/497; 362/540; 362/498
(58) Field of Classification Search .................. 362/497, 362/498, 499, 473, 505, 540
See application file for complete search history.

(56) References Cited

U.S. PATENT DOCUMENTS 7,341,364 B2* 3/2008 Yamaguchi et al. .......... 362/473
2006/0077677 A1* 4/2006 Yamaguchi et al. .......... 362/473

* cited by examiner

*Primary Examiner* — Ali Alavi
(74) *Attorney, Agent, or Firm* — Leong C. Lei

(57) ABSTRACT

A motorcycle taillight includes a base, a light source unit, and a hood. The base includes a first bulb seat, which receives a primary light source of a light source unit mounted therein. An extension section extends from an underside of the first bulb seat in a direction toward the rear side of the motorcycle. The extension section has an underside to which a second bulb seat is mounted. The second bulb seat is located at a free end of the extension section to receive a license plate light of the light source unit mounted therein. The hood has a shielding section corresponding in position to the second bulb seat of the base. A cover is arranged under the shielding section. As such, the white light that is used to illuminate a license plate cannot be seen from the rear side of the motorcycle.

4 Claims, 6 Drawing Sheets

STRUCTURE OF MOTORCYCLE TAILLIGHT

TECHNICAL FIELD OF THE INVENTION

The present invention generally relates to a structure of motorcycle taillight, and more particularly to a motorcycle taillight that completely prevents the white light that illuminates a license plate from being seen from the rear side of the motorcycle in order to comply with vehicle safety regulations and to make illumination of the taillight uniform.

DESCRIPTION OF THE PRIOR ART

To comply with traffic regulations, as shown in FIG. 1, a motorcycle 1 must be provided with a headlight 11, front turn signals 12, rear turn signals 13, a taillight 14, and a license plate light 15. The taillight 14 is primarily provided as a reminder for the following drivers and is thus set as a red light, while the license plate light 15 is to illuminate a license plate 16 and is usually a white light.

As shown in FIG. 2, a conventional structure of taillight 2 comprises a base 21, a light source unit 22, and a hood 23. The base 21 forms a bulb seat 211, which receives and retains therein the light source unit 22. The hood 23 is mounted to the base 21 and houses the light source unit 22. The hood 23 is provided on a lower side thereof with a horizontally arranged clear cover 24 (white light). As such, when the light source unit 22 is set into operation (being energized), a major portion of the light is allowed to transmit through the hood 23 (red hood) to travel in a direction toward the rear side of the vehicle so as to provide an alarming effect, while a small portion of the light travels downward through the clear cover 24 to illuminate the license plate 16, so as to realize alarming of the taillight 2 and illumination of the license plate 16. However, due to factors relating to de-molding of the hood 23 in the manufacturing process thereof, the conventional taillight 2 allows a portion of the white light that illuminates the license plate 16 to travel in the rearward direction of the vehicle. In other words, the white light that is supposed to illuminate the license plate 16 can be seen from the rear side of the vehicle and this may cause violation of traffic safety regulations.

FIG. 3 shows another conventional taillight 3, which comprises a base 31, a light source unit 32, and a hood 33. The base 31 has a projection forming a bulb seat 311 for receiving the light source unit 32 mounted therein. The hood 33 is mounted to the base 31 to house the light source unit 32. The hood 23 is provided at a lower side thereof with a clear cover 24 (white). As such, when the light source unit 32 is set into operation (being energized), a major portion of the light is allowed to transmit through the hood 33 (red hood) to travel in a direction toward the rear side of the vehicle so as to provide an alarming effect, while a small portion of the light travels downward through the clear cover 34 to illuminate the license plate 16, so as to realize alarming of the taillight 2 and illumination of the license plate 16. To prevent the white light that illuminates the license plate 16 from transmitting rearward of the vehicle body, the conventional taillight 3 comprises a shielding plate 331 under the hood 33 at a location close to the clear cover 34. The shielding plate 331 is of the same red color as the hood 33 and functions to shield the white light that illuminates the license plate 16 in order to prevent the white light that illuminates the license plate 16 from being seen in the rear side of the vehicle body and thus complying with traffic safety regulations. Due to the arrangement of the shielding plate 331 projecting from the hood 33, the conventional taillight 3 shows a poor outside appearance as a commercial product and the design is made complicated.

Although both known taillights are effective in providing alarm for the following drivers and the desired illumination of the license plate, these conventional taillights each have severe drawbacks that must be overcome.

SUMMARY OF THE INVENTION

A primary objective of the present invention is to provide a motorcycle taillight, which comprises a base, a light source unit, and a hood. The base comprises a first bulb seat, which receives a primary light source of a light source unit mounted therein. An extension section extends from an underside of the first bulb seat in a direction toward rear side of the motorcycle body and has an underside carrying a second bulb seat at a free end of the extension section to receive a license plate light of the light source unit mounted therein. The hood comprises a shielding section corresponding in position to the second bulb seat of the base. A cover is arranged under the shielding section. As such, the white light that illuminates a license plate cannot be seen from the rear side of the motorcycle in order to realize compliance with traffic safety regulations and also to make lighting of the taillight uniform.

Another objective of the present invention is to provide a motorcycle taillight, wherein the base is provided with the extension section, which carries, on the underside thereof, the second bulb seat located at a free end of the extension section for receiving the license plate light of the light source unit mounted therein, whereby the second bulb seat is located more close to the license plate, and engineering for positional arrangement of the taillight and the license plate is made easy.

A further objective of the present invention is to provide a motorcycle taillight, wherein the hood forms a shielding section that corresponds in location to the second bulb seat of the base and that comprises a reflector mounted thereto, whereby it can be more effective in preventing the white light that irradiates the license plate from being seen from the rear side of the motorcycle.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 6A is an enlarged view of a portion of FIG. 6.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
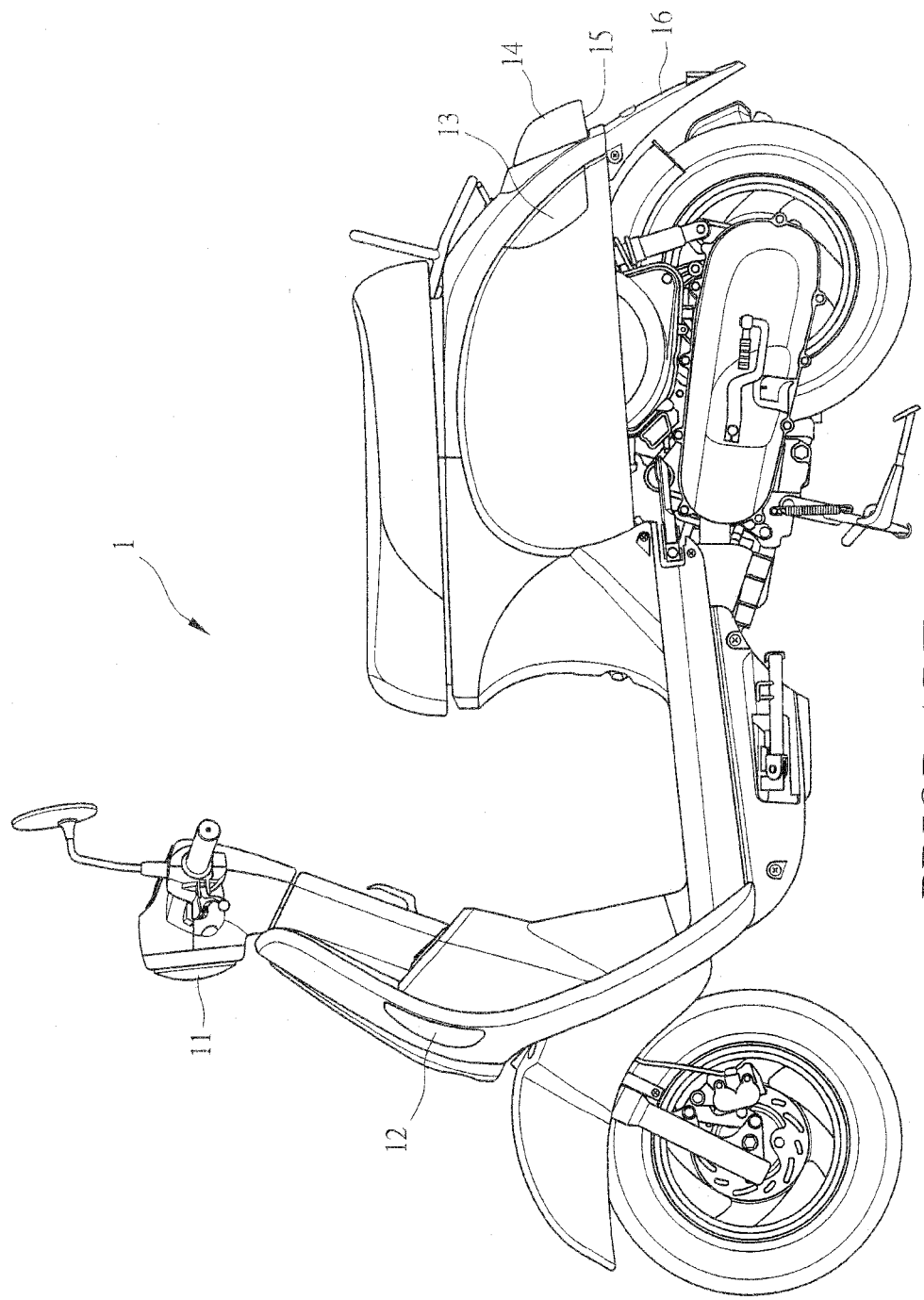
FIG. 1 is a schematic view showing a conventional arrangement of motorcycle light.
Figure 3:
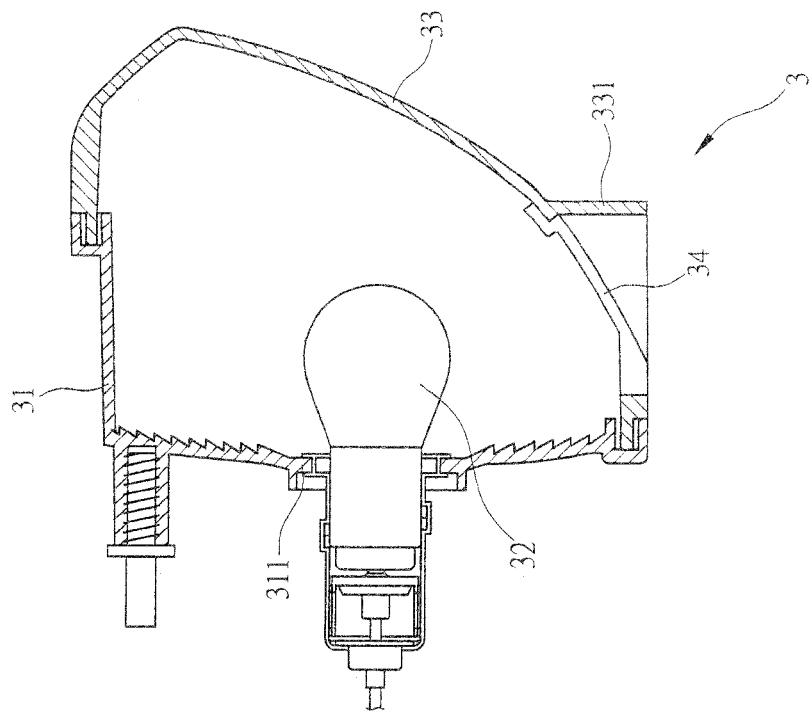
FIG. 3 is a cross-sectional view showing another conventional taillight.
Figure 2:
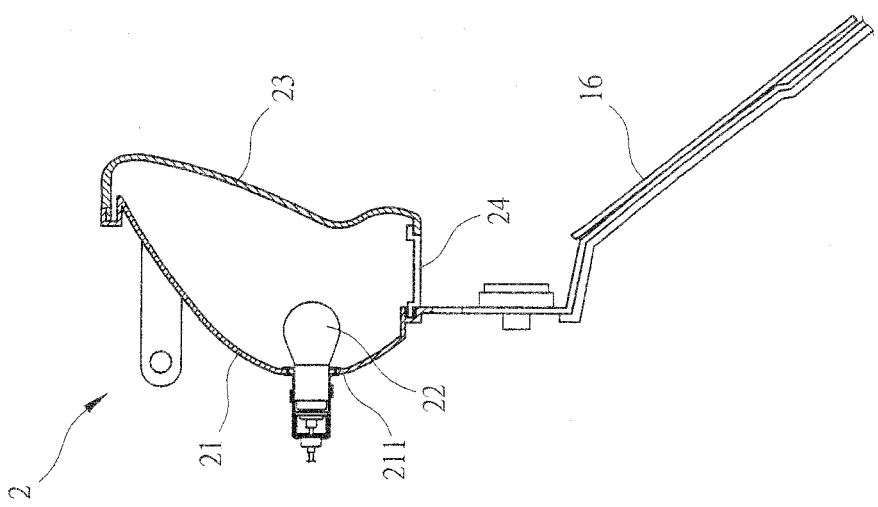
FIG. 2 is a cross-sectional view showing a conventional taillight.
Figure 4:
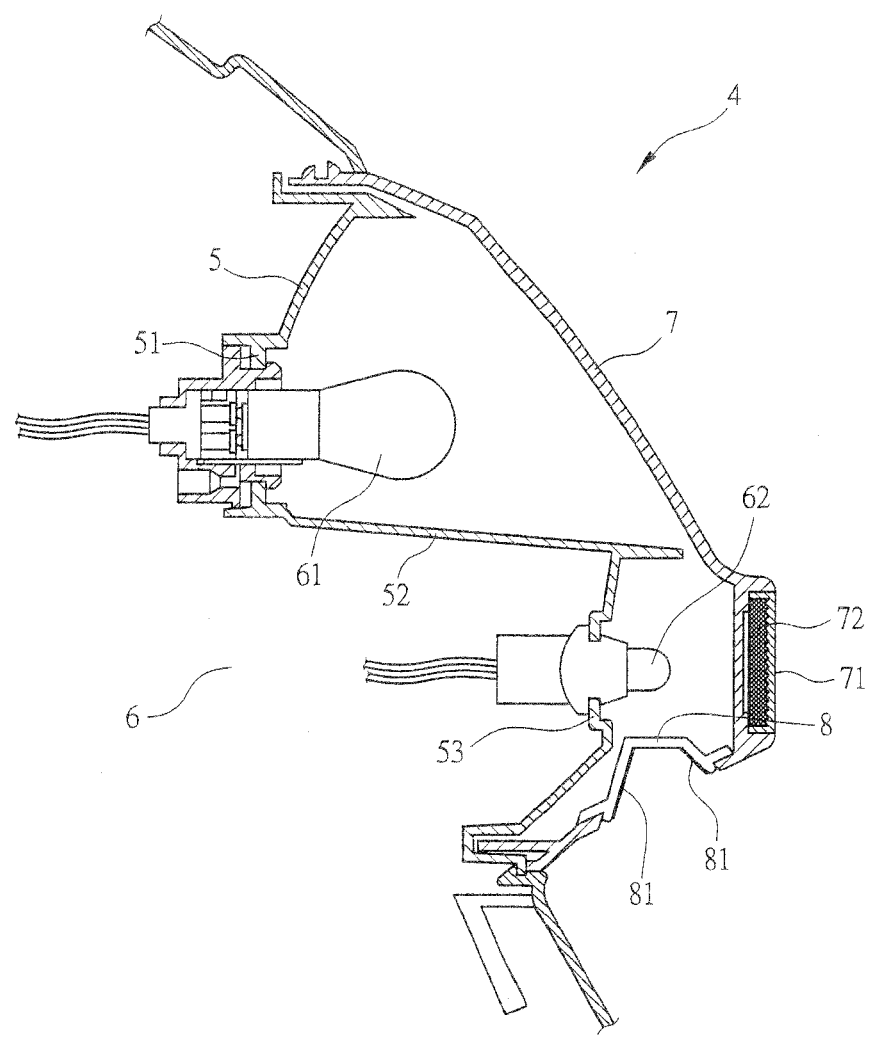
FIG. 4 is a cross-sectional view showing a taillight according to the present invention.
Figure 5:
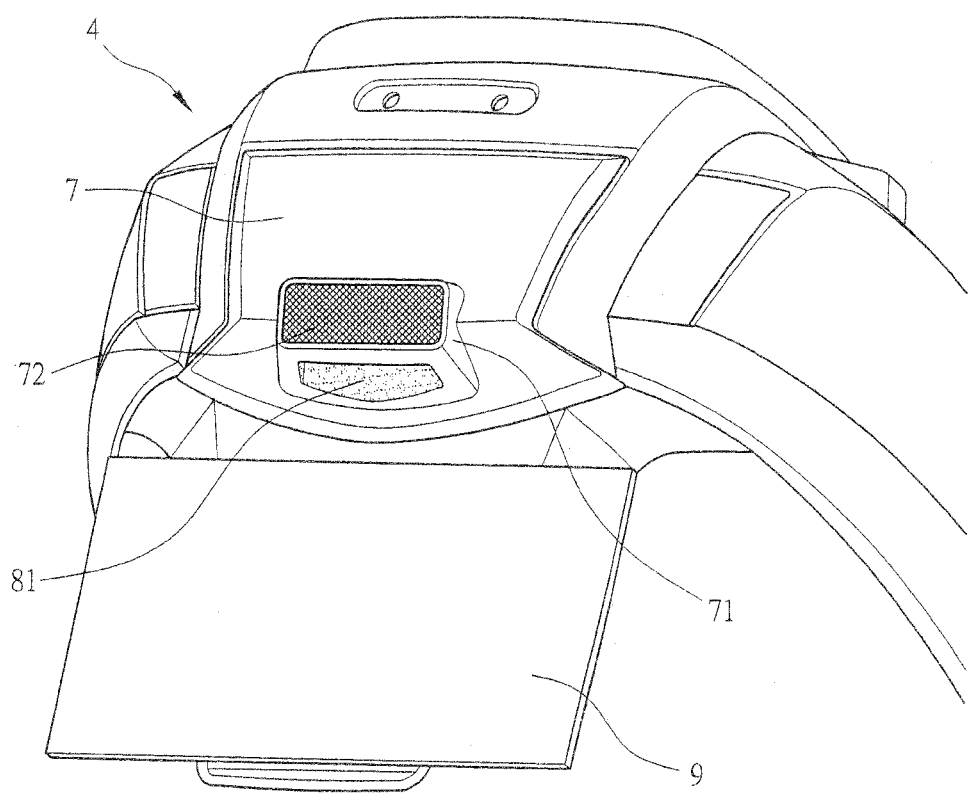
FIGS. 5 and 6 are schematic views illustrating applications of the present invention.
Figure 6:
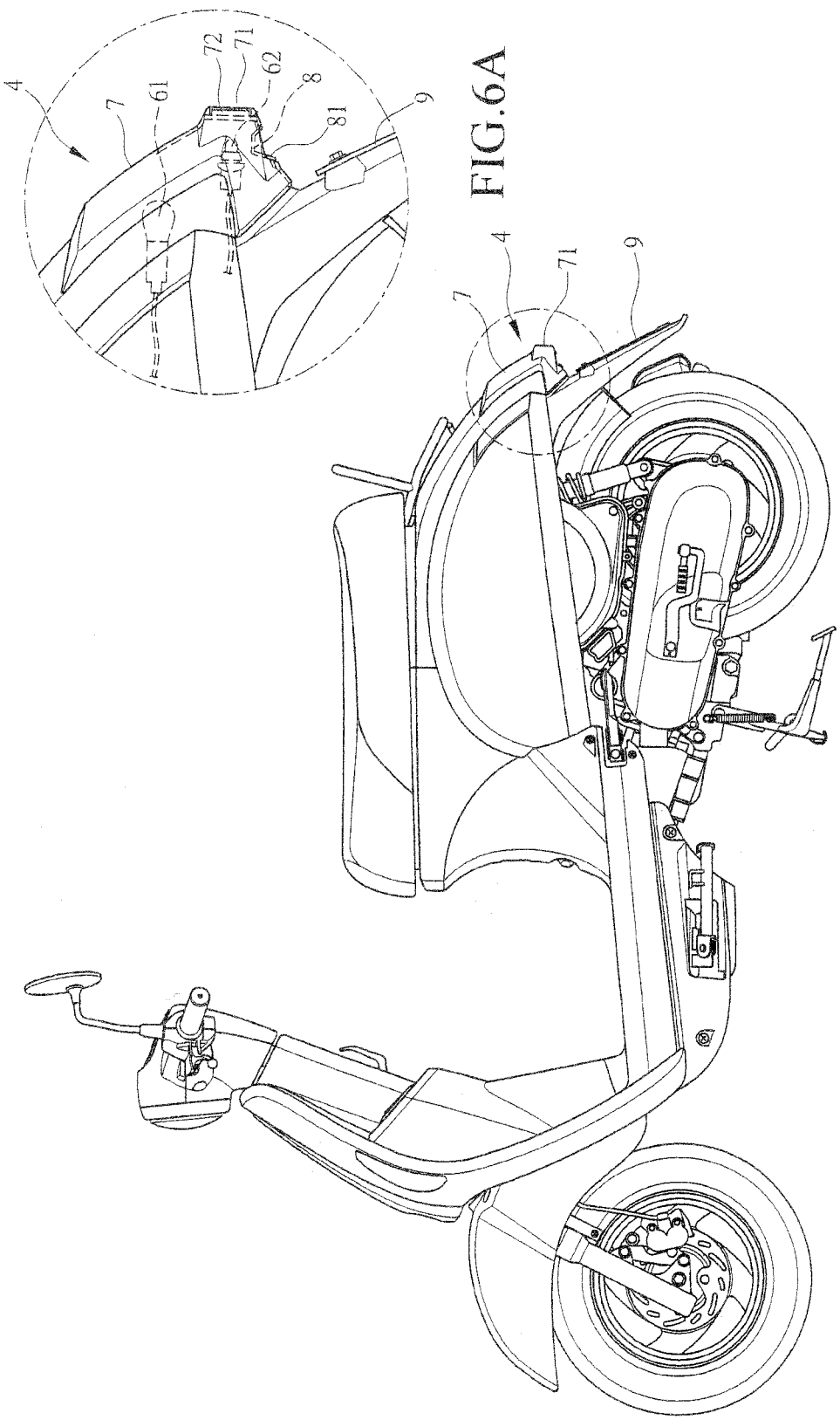

Referring first to FIG. 4, the present invention provides a taillight, generally designated at 4, comprising a base 5, a light source unit 6, a hood 7, and a cover 8.

The base 5 forms a first bulb seat 51, which receives and retains a primary light source 61 of the light source unit 6. An extension section 52 extends from an underside of the first bulb seat 51 toward a rear side of vehicle body. The extension section 52 has an underside on which a second bulb seat 53 is formed so that the second bulb seat 53 is located at a free end of the extension section 52 to receive and retain therein a license plate light 62 of the light source unit 6. With such an arrangement, the primary light source 61 and the license plate light 62 of the light source unit 6 form a horizontally-shifted, front and rear arrangement, wherein the license plate light 62 is located more rearward of the vehicle body than the primary light source 61.

The light source unit 6 comprises the primary light source 61 and the license plate light 62, which are respectively set in the first bulb seat 51 and the second bulb seat 53 of the base 5. The primary light source 61 provides tail lighting and brake lighting.

The hood 7 comprises a body made of a light-transmitting material (which is preferably red in color). The hood 7 is mounted on the base 5 to house the light source unit 6. The hood 7 comprises a shielding section 71 corresponding horizontally in position to the second bulb seat 53 of the base 5. The shielding section 71 is preferably provided with a light reflector 72. A clear (white) cover 8 is provided under the shielding section 71. The cover 8 has a circumferential edge portion 81 that is provided with a coating of dark paint or opaque (non-light-transmittable) paint for preventing white light from transmitting through the cover 8 in a direction rearward of the vehicle body.

Referring to FIGS. 4, 5, 6 and 6A, to practice the present invention, the primary light source 61 of the light source unit 6 is mounted to the first bulb seat 51 of the base 5 and the license plate light 62 mounted to the second bulb seat 53 of the base 5. When a motorcycle user activates the taillight 4, light emitting from the primary light source 61 of the light source unit 6 transmits through a portion of the hood 7 that is located above the shielding section 71 to travel in a direction toward the rear side of the vehicle body, while light emitting from the license plate light 62 of the light source unit 6 is shielded by the shielding section 71 of the hood 7 and is only allowed to irradiate the license plate 9 through the clear cover 8. As such, the primary light source 61 of the light source unit 6 provides lighting alarm of braking and position indication of the taillight 4, while the license plate light 62 provides lighting of the license plate 9. Further, the shielding section 71 of the hood 7 provides a shielding function that ensures the white light illuminating the license plate light 62 cannot be seen from the rear side of the vehicle body.

Figure 7:
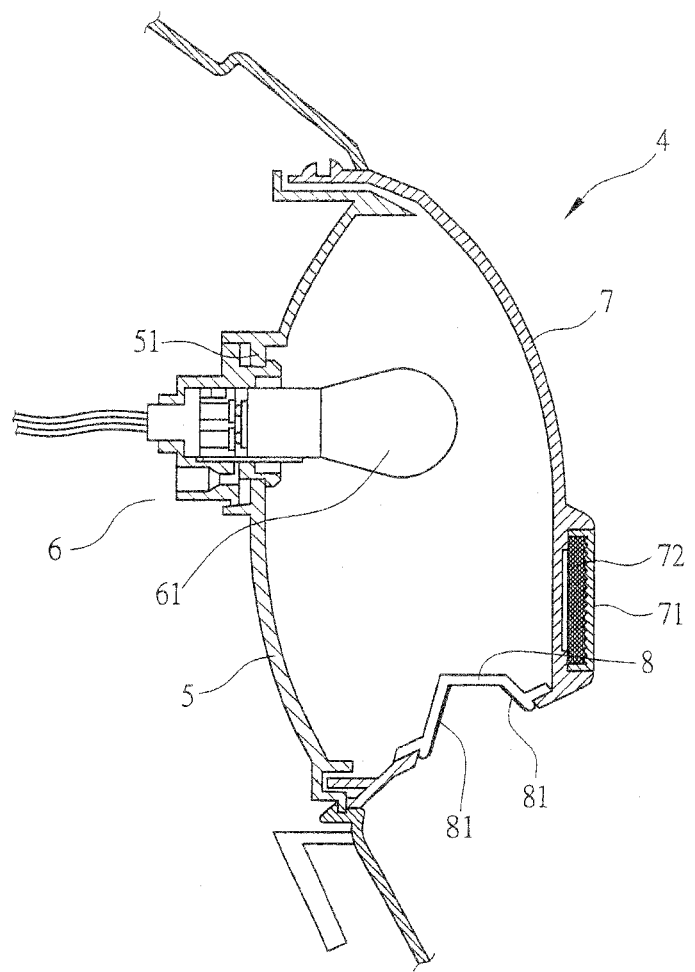
FIG. 7 is a cross-sectional view showing another embodiment according to the present invention.

Referring to FIG. 7, which shows a second embodiment of the present invention, the light source unit 6 of the embodiment comprises a single light source of primary light source 61 and thus, the base 5 of the embodiment comprises only the first bulb seat 51. Similarly, the primary light source 61 of the light source unit 6 is mounted to the first bulb seat 51 of the base 5. When the motorcycle user activates the taillight 4, a major of the light emitting from the primary light source 61 of the light source unit 6 is allowed to transmit, in a direction toward the rear side of the vehicle body, through a portion of the hood 7 that is located above the shielding section 71 to provide lighting alarm of braking and position indication of the taillight 4, while a minor portion of the light emitting from the primary light source 61 of the light source unit 6 is allowed to transmit through the clear cover 8 for irradiating the license plate 9. This minor portion of light is shielded by the shielding section 71 of the hood 7 and the circumferential edge portion 81 of the cover 8 is provided with a coating of dark paint, whereby completely not white light that irradiates the license plate 9 can be seen from the rear side of the vehicle body. Further, the shielding section 71 is preferably provided with a reflector 72, which on the one hand, prevents the light of the license plate light 62 from transmitting rearward of the vehicle body, and on the other hand, makes more brilliant lighting effect of the taillight 4.

The effectiveness of the present invention is that a front and rear shifted arrangement is made for the primary light source 61 and the license plate light 62 of the light source unit 6 by providing a base 5 that forms a first bulb seat 51 that receives and retains the primary light source 61 of the light source unit 6 and also forms an extension section 52 that extends from an underside of the first bulb seat 51 in a direction toward the rear side of the vehicle body to carry a second bulb seat 53 that is mounted under the extension section 52 and located at a free end of the extension section 52 for receiving and retaining therein the license plate light 62 of the light source unit 6 and a hood 7 is provided and comprises a shielding section 71 corresponding in position to the second bulb seat 53 of the base 5, whereby completely no white light that irradiates a license plate 9 can be seen from the rear side of the vehicle body for compliance with traffic safety regulations and further, the lighting of the taillight 4 is made uniform.

Further, the present invention provides a base 5 that forms an extension section 52 to carry on an underside thereof a second bulb seat 53, which is located at a free end of the extension section 52 to receive and retain therein a license plate light 62 of a light source unit 6, whereby the second bulb seat 53 is located more close to the license plate 9, and engineering for positional arrangement of the taillight 4 and the license plate 9 is made easy.

Further, the present invention provides a hood 7 that forms a shielding section 71 that corresponds in location to the second bulb seat 53 of the base 5 and that comprises a reflector 72 mounted thereto, whereby it can be more effective in preventing the white light that irradiates the license plate 9 from being seen from the rear side of the vehicle body.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A motorcycle taillight, comprising a base, a light source unit, and a hood, characterized in that the base comprises a first bulb seat, which receives a primary light source of the light source unit mounted therein, an extension section extending from an underside of the first bulb seat in a direction toward rear side of a motorcycle body and having an underside carrying a second bulb seat at a free end of the extension section to receive a license plate light of the light source unit mounted therein, the hood comprising a shielding section corresponding in position to the second bulb seat of the base, a cover being arranged under the shielding section;

wherein the primary light source and the license plate light of the light source unit form a front and rear shifted arrangement;

wherein the license plate light is located more rearward of the motorcycle body than the primary light source; and wherein the shielding section comprises a reflector.

2. The motorcycle taillight according to claim 1, wherein the cover is clear and light-transmitting.

3. The motorcycle taillight according to claim 1, wherein the cover has a circumferential edge portion that is provided with a coating of dark paint.

4. The motorcycle taillight according to claim 1, wherein the cover has a circumferential edge portion that is provided with a coating of opaque paint.

* * * * *